UNITED STATES PATENT OFFICE.

HERMAN A. BRUSON, OF AKRON, OHIO, ASSIGNOR TO THE GOODYEAR TIRE & RUBBER COMPANY, OF AKRON, OHIO, A CORPORATION OF OHIO.

METHOD OF TREATING RUBBER.

No Drawing.  Application filed September 28, 1926. Serial No. 138,338.

My invention relates to a method of treating rubber and it has particular relation to a method of treatment whereby a rubber product is rendered more resistant to the deteriorating effects of atmospheric agents.

The object of this invention is to provide a class of organic compounds which, when associated with rubber, render it less susceptible to oxidation.

Vulcanized rubber, like other organic substances is attacked by such atmospheric agents as oxygen, ozone and sunlight. While the action of these agents is not clearly understood, it has been observed that the destructive phenomenon may be retarded to a greater or lesser extent by incorporating in the rubber certain organic compounds. Many such compounds have been suggested; these are commonly known in the art as "antioxidants", for example, the reaction products of certain amines and aldehydes are employed extensively in this capacity.

I have discovered that the reaction products of aliphatic oxides and particularly of the olefine series, such, for example, as ethylene or propylene oxide, and an amine, especially of the aromatic series, such as aniline or toluidine, impart marked preserving or age-resisting qualities when incorporated in a rubber mix.

A typical procedure for preparing an antioxidant which comes within the scope of my invention would involve causing molecular proportions of aniline and ethylene oxide to react. If the interaction is conducted at or below 50° C., it may be represented as follows:

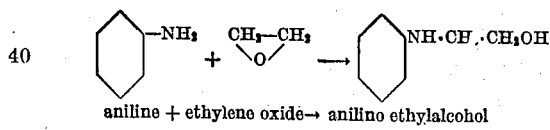

aniline + ethylene oxide → anilino ethylalcohol and is typical of a general reaction that may be represented as follows:

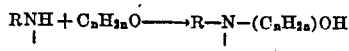

Although the reaction mixture may contain some of the disubstituted product it may be utilized as an antioxidant without purification. Thus, in practising the invention I incorporate the material so prepared in a rubber mix by adding it to the rubber composition during the milling operation. The superiority of compositions prepared according to the principles of my invention when contrasted to rubber compositions embodying no antioxidant is marked. For example, when test samples have the following ratio of ingredients: 100 part rubber (acetone extracted), 5 parts ZnO, 3 parts sulfur, 1.5 parts stearic acid, 1 part hexamethylene tetramine, 2 parts anilino ethyl alcohol, are subjected to the action of oxygen maintained at 60° C. and under a pressure of 400 pounds per square inch, only a slight decrease in tensile strength is observed, even after twenty-four hours exposure. Whereas samples made with the identical formula, but having no anilino ethyl alcohol, oxidize to form a plastic mass. The results of physical tests are recorded below:

| Time of vulc., mins. at 40# steam pressure | Tensile strength—Kgs./cm.² | | | |
|---|---|---|---|---|
| | Before aging test | | After aging test. | |
| | Without antioxidant. | With antioxidant. | Without antioxidant. | With antioxidant. |
| 30 | | 135 | | 150 |
| 50 | 160 | 170 | No tensile | 180 |
| 70 | 175 | 215 | ...do... | 190 |

Other amino bodies may be employed in place of the aniline in manufacturing the antioxidant; for example, toluidine, xylidine, alpha or beta naphthylamine, aminoanthraquinone or their homologues, as well as derivatives or substitution products thereof. In the same manner, other aliphatic oxides and more particularly those of the olefine series might be employed, such as propylene oxide, also derivatives of these materials, such as chlorhydrines when employed with an alkali, as for example ethylene chlorhydrine, or epichlorhydrine and caustic soda. The reaction employing chlorhydrine may be represented as follows:

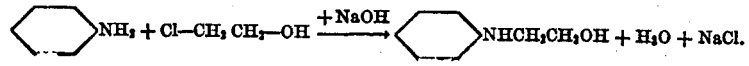

If it is desired that a pure antioxidant compound be employed, it may be isolated from the reaction mass by distillation or crystallization. It is unnecessary, however, to purify the reaction product, inasmuch as the various side reaction products, as well as derivatives thereof are likewise either of value for their antioxidant properties or harmless as regards the quality of the final rubber product. Moreover, they are substantially inert with respect to the rubber mass, in that they are non-accelerators and do not interfere with other ingredients that may be incorporated in the rubber mass.

From the description hereinabove set forth, it will be understood that the principles of my invention are neither limited to the specific rubber composition employed in the test samples nor to the several specific materials enumerated as having antioxidant properties when incorporated in such a rubber mass. Moreover it will be appreciated by those skilled in the art that the invention is susceptible of numerous modifications and wide application without departing from its scope and I desire, therefore, that it be limited only to accord with the prior art and the appended claims.

What I claim is:

1. A method of preserving the quality of vulcanized rubber that comprises associating the reaction product of an aliphatic oxide and an amine with the rubber.

2. A method of preserving the quality of vulcanized rubber that comprises incorporating the reaction product of an olefine oxide and an aromatic amine in the rubber.

3. A method of preserving the quality of vulcanized rubber that comprises associating the reaction product of a chlorhydrine, an amine, and an alkali, with the rubber.

4. A method of preserving the quality of vulcanized rubber that comprises incorporating the reaction product of an aromatic amine, a chlorhydrine, and a caustic alkali, with the rubber.

5. A method of preserving the quality of vulcanized rubber that comprises associating a material having the structural formula:

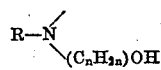

or derivative of this material with the rubber.

6. A method of preserving the quality of vulcanized rubber that comprises incorporating a material having the structural formula:

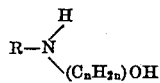

or a derivative of this material with the rubber before vulcanization.

7. A method of preserving the quality of vulcanized rubber that comprises incorporating with the rubber a material having the structural formula:

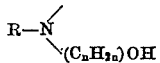

where R is an aryl radical.

8. A method of preserving the quality of vulcanized rubber that comprises incorporating with the rubber a material having the structural formula:

or derivative of this material where R is an aryl radical.

9. A method of preserving the quality of vulcanized rubber that comprises incorporating with the rubber a material having the structural formula:

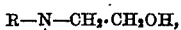

or derivative of this material where R is a phenyl group.

10. A method of preserving the quality of rubber that comprises incorporating with the rubber anilino ethyl alcohol.

11. A vulcanized rubber product embodying the reaction product of an olefine oxide and an amine.

12. A vulcanized rubber product embodying the reaction product of an olefine oxide and an aromatic amine.

13. A vulcanized rubber product embodying

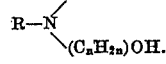

14. A vulcanized rubber product embodying

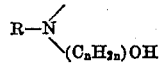

or derivative of this material where R is an aryl radical.

15. A vulcanized rubber product embodying anilino ethyl alcohol.

In witness whereof, I have hereunto signed my name.

HERMAN A. BRUSON.